No. 796,413. PATENTED AUG. 8, 1905.
R. W. BUTLER.
SPEAR.
APPLICATION FILED JUNE 23, 1904.
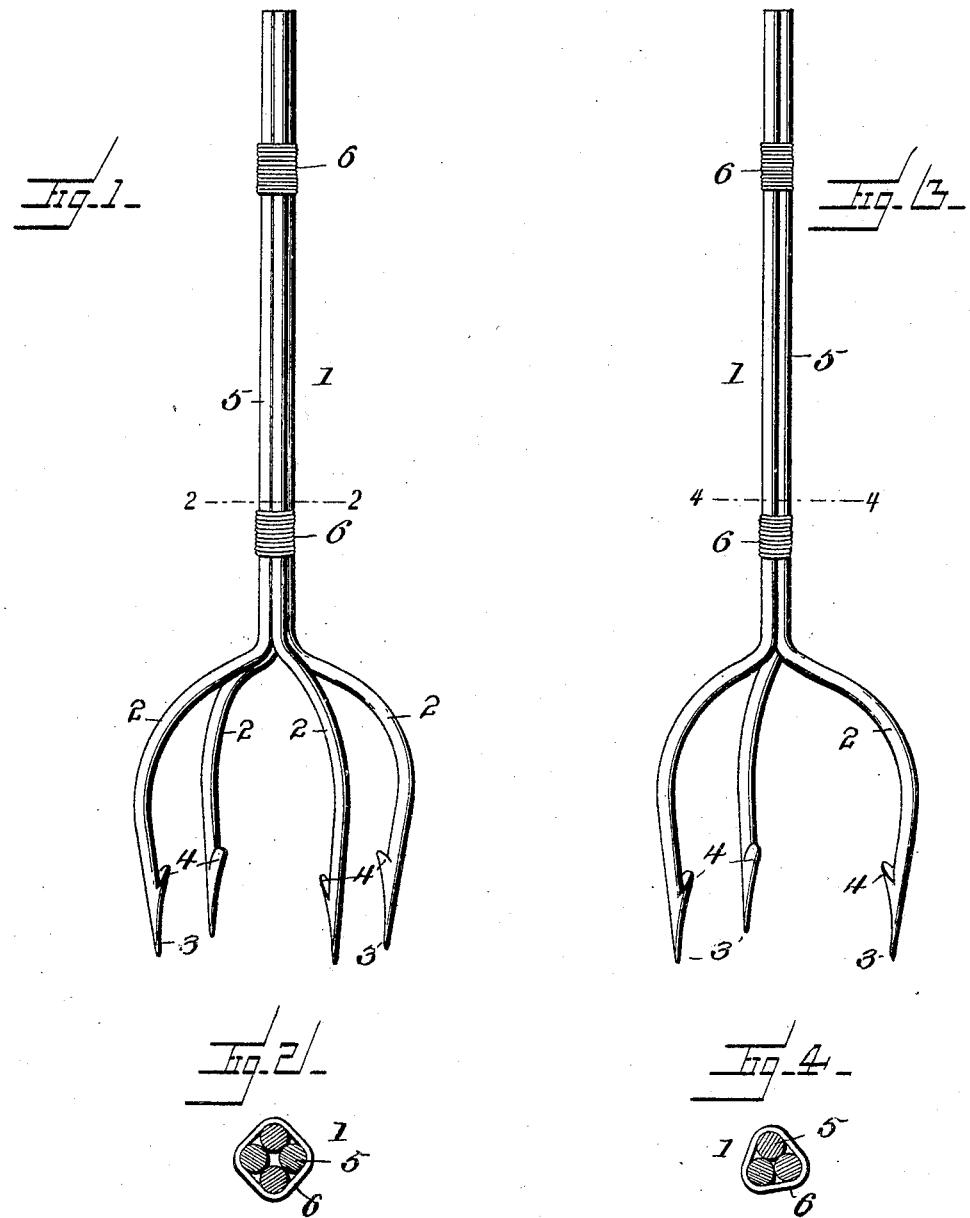
WITNESSES:
INVENTOR
Robert W. Butler.
BY
Attorney

UNITED STATES PATENT OFFICE.

ROBERT W. BUTLER, OF LITTLE ROCK, ARKANSAS, ASSIGNOR OF ONE-HALF TO ARTHUR NEILL, OF LITTLE ROCK, ARKANSAS.

SPEAR.

No. 796,413.          Specification of Letters Patent.          Patented Aug. 8, 1905.

Application filed June 23, 1904. Serial No. 213,839.

*To all whom it may concern:*

Be it known that I, ROBERT W. BUTLER, a citizen of the United States of America, residing at Little Rock, in the county of Pulaski and State of Arkansas, have invented a certain new and useful Spear, of which the following is a specification, reference being had therein to the accompanying drawings.

This invention relates to spears for catching frogs and the like; and the object of the invention is to provide a device for spearing frogs, &c., in which the prongs or hooks and the points and barbs thereof are so disposed with relation to each other that it is unnecessary for the sportsman to use special care in holding and casting the spear in order to enable the line of points of the prongs to fall crosswise of the object aimed at. The arrangement of prongs is such as to give the greatest possible range and latitude in casting the spear and enables the same to be manipulated rapidly, which is particularly valuable in a device of the character referred to, as the implement is generally used at night with the light of a torch only.

A further object of the invention is to so construct and dispose the prongs or hooks that they will flex or yield when the animal is struck, especially when all the prongs come in contact with and penetrate the animal, the springing or flexing of the prongs having a tendency to draw the points and barbs toward each other and clench the hold on the animal.

The material of which the prongs are formed is so tempered that while the necessary resiliency is imparted thereto said prongs may be forcibly bent to carry the points outward or inward to any desired extent for the purpose of adapting the spear to game of different sizes.

With the above and other objects in view, the nature of which will more fully appear as the description proceeds, the invention consists in the novel construction, combination, and arrangement of parts as herein fully described, illustrated, and claimed.

In the accompanying drawings, Figure 1 is a perspective view of a four-pronged spear embodying the present invention. Fig. 2 is a cross-section through the same on the line 2 2 of Fig. 1. Fig. 3 is a perspective view of a three-pronged spear involving the same principle. Fig. 4 is a cross-section through the same on the line 4 4 of Fig. 3.

Like reference-numerals designate corresponding parts in all figures of the drawings.

The spear contemplated in this invention comprises a shank 1 and a series of prongs 2, radiating in curved lines therefrom, the prongs being pointed, as shown at 3, and provided with barbs 4.

The shank 1 is preferably composed of the grouped stems or individual shanks 5 of the several prongs, as shown, the same being bound or secured together in any firm or convenient manner—as, for example, by wrapping one or more strands of cord, wire, or other material around the same, or brazing or welding or otherwise uniting the individual shanks.

The prongs are so bent and diverged as to dispose their points in a circle, of which the stem 1 is the center, or substantially so, and said points instead of hooking or curving backward and inward, as in the ordinary multiple-cluster fish-hook, are extended in the opposite direction, or, in other words, away from the shank 1 or the point of junction of the prongs, which point may be termed the "spear-crown." The arrangement described is clearly shown in Figs. 1 and 3, and it will also be seen that each prong is provided with a barb 4, preferably at the inner side.

Any desired number of prongs may be used, and they are by preference tempered to give a certain degree of elasticity or spring action in order that the prongs may yield or spring away from each other as they penetrate an animal and crowd the barbs into the animal in their reflex action, thus giving a firm and secure hold on the animal. The springing apart of the prongs is caused by the inner faces of the barbed points, which faces diverge toward the extremities of the barbed points. The prongs may also be forcibly bent outward or inward to any desired degree to enlarge or diminish the size of the circle of the prongs for adapting the spear to game of different sizes.

By arranging the prong-points in a circle instead of a straight line a greater range and latitude is given in aiming and casting the spear, for the reason above stated. The arrangement as a whole is productive of a good, practical, and reliable spear capable of rapid manipulation without special care or attention on the part of the sportsman.

Having thus described the invention, what is claimed as new is—

1. A spear comprising a shank, and a series of flexible prongs projecting beyond the end thereof and having barbed points disposed in a circle the center of which is in line with the shank.

2. A spear comprising a shank, and a series of barbed prongs so disposed and tempered that they will flex and yield outwardly when the animal is struck, the inward reflex action of the prongs having the effect of forcing the barbs into the animal.

In testimony whereof I affix my signature in presence of two witnesses.

ROBERT W. BUTLER.

Witnesses:
J. E. MONS,
W. R. DULEY.